United States Patent [19]

Okutsu

[11] Patent Number: 4,755,896

[45] Date of Patent: Jul. 5, 1988

[54] CONTACT START/STOP-TYPE FIXED MAGNETIC DISK APPARATUS WITH WIND VANE POSITIONING

[75] Inventor: Naohiro Okutsu, Kamakura, Japan

[73] Assignee: Mitsubishi Denki Kabushiki Kaisha, Japan

[21] Appl. No.: 938,236

[22] Filed: Dec. 4, 1986

[30] Foreign Application Priority Data

Dec. 5, 1985 [JP] Japan .................. 60-272526

[51] Int. Cl.⁴ .................. G11B 5/54; G11B 21/21; G11B 21/02; G11B 21/12
[52] U.S. Cl. .................. 360/105; 360/75; 360/103; 360/106
[58] Field of Search .................. 360/105, 103, 106, 75

[56] References Cited

U.S. PATENT DOCUMENTS 4,647,997 3/1987 Westwood .................. 360/103
4,692,829 9/1987 Campbell .................. 360/103

FOREIGN PATENT DOCUMENTS 56-77027 6/1981 Japan .

OTHER PUBLICATIONS

"Design of a Swinging Arm Actuator", IBM Journal of Research and Development, vol. 20, No. 4, Jun. 1976, pp. 389–397.

Primary Examiner—Robert S. Tupper
Attorney, Agent, or Firm—Leydig, Voit & Mayer

[57] ABSTRACT

A CSS-type fixed magnetic disk apparatus is disclosed which has a magnetic disk with a landing zone on which no positional information is recorded. A swinging arm actuator which supports a magnetic head has a plate mounted on it which is subjected to wind pressure produced by the rotation of the disk. When the rotational speed of the disk reaches a certain level, the wind pressure acting on the plate rotates the actuator outwards so that the magnetic head is automatically moved from the landing zone into the data zone of the disk. When the magnetic head is in the data zone, the position of the magnetic head is controlled by servo control using a voice coil motor.

13 Claims, 2 Drawing Sheets

CONTACT START/STOP-TYPE FIXED MAGNETIC DISK APPARATUS WITH WIND VANE POSITIONING

BACKGROUND OF THE INVENTION

This invention relates to a fixed magnetic disk apparatus, and more particularly to a CSS-type (contact start/stop) disk apparatus in which positional information which is recorded on the disk is not injured by contact between the magnetic head and the magnetic disk of the apparatus.

A CSS-type fixed magnetic disk apparatus is one which has a magnetic head which is in contact with the surface of a magnetic disk when the magnetic disk is stationary or being started or stopped, and which during normal operation floats above the surface of the disk. The disk has an annular data zone formed thereon, and on either the inside or the outside of the data zone, a special annular region called a landing zone is provided on the surface of the disk for the magnetic head to contact during starting and stopping. It is conventional to record positional information on the landing zone, the information being used to position the magnetic head. However, over a period of time, the contact between the magnetic head and the landing zone during starting and stopping produces scratches on the surface of the landing zone, and these scratches can result in the deterioration of the positional information recorded thereon, making the disk apparatus inoperable.

In order to protect the positional information recorded on a landing zone, Japanese Laid-Open Utility Model Application No. 56-77027 (1981) discloses a magnetic disk having an extremely thin film (approximately 1 micron thick) of a hard magnetic material formed atop the landing zone of the disk. The thin film protects the surface of the landing zone so that even though the surface of the film may become scratched by contact with a magnetic head, the landing zone itself and the information recorded thereon remain intact. However, in accordance with that invention, it is necessary to form a shallow ledge in the surface of the disk on which to apply the film. The process of cutting the ledge and the application of the film increase the manufacturing costs of the disk. Therefore, that invention is not a satisfactory solution to the problem of preventing scratches from causing the loss of positional information.

SUMMARY OF THE INVENTION

It is the object of the present invention to provide a fixed magnetic disk apparatus which has no positional information recorded on the landing zone of a disk so that there is no possiblity of positional information being damaged by contact with the magnetic head of the apparatus during starting and stopping.

A fixed magnetic disk apparatus according to the present invention has a swinging arm actuator which supports a magnetic head for reading information from a fixed magnetic disk. The magnetic disk has a landing zone one which no information is recorded. A biasing spring exerts a torque on the actuator in the direction tending to make it rotate towards the center of the disk. A plate is attached to the actuator in a position so as to be subjected to wind pressure due to the rotation of the disk. The wind pressure acting on the plate produces a torque on the actuator which opposes the torque exerted by the biasing spring and which tends to rotate the actuator away from the center of the disk. During starting of the magnetic disk when the magnetic head is in the landing zone, wind pressure due to the rotation of the disk exerts a force on the plate which causes the actuator to pivot outwards until the magnetic head enters the data zone, where the torque exerted by the wind pressure is balanced by the torque exerted by the biasing spring. Because the magentic head is automatically moved from the landing zone to the data zone by wind pressure, it is unnecessary to record positional information on the landing zone for controlling the movement of the actuator.

The plate which is subjected to wind pressure can be mounted on the actuator so that when the magnetic head has entered the data zone by a prescribed amount, the plate is positioned to the outside of the disk and is no longer subjected to wind pressure.

Alternatively, the plate can be mounted on the actuator in a position such that it will at all times be subjected to wind pressure due to the rotation of the disk, regardless of the location of the magnetic head within the data zone. By mounting the plate in this manner, the torque on the actuator due to the wind pressure acting on the plate nearly balances the torque due to the biasing spring and reduces the torque which must be exerted on the actuator by a voice coil motor to control the movement of the magnetic head within the data zone.

BRIEF DESCRIPTION OF THE DRAWINGS

In the figures, the same reference numerals indicate the same or corresponding parts.

DESCRIPTION OF THE PREFERRED EMBODIMENTS

Figure 1:
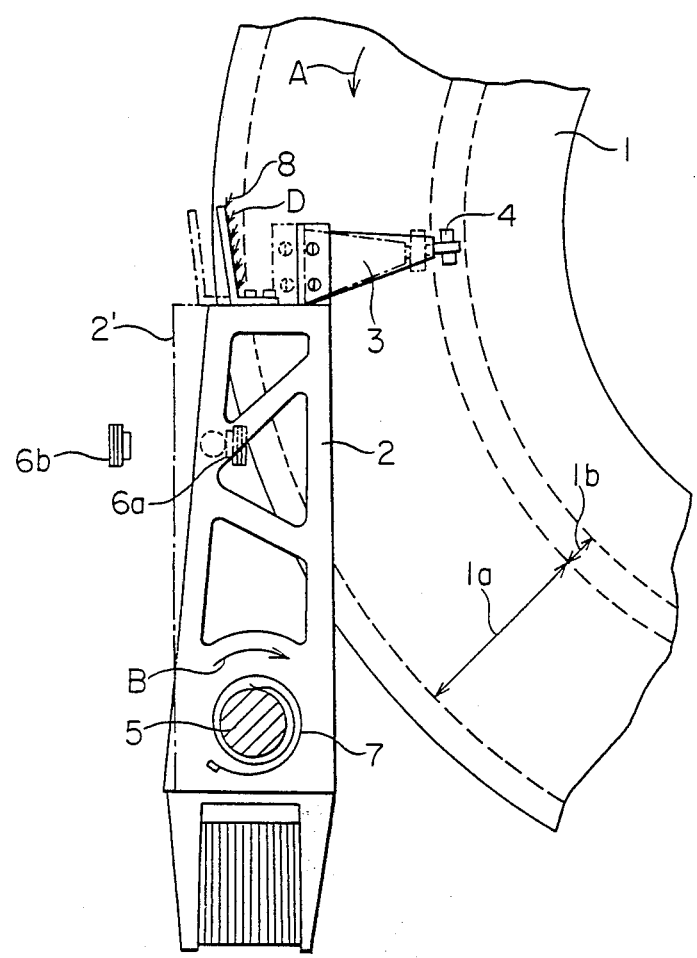
FIG. 1 is a plan view of the essential features of a first embodiment of a fixed magnetic disk apparatus according to the present invention.

Hereinbelow, a number of preferred embodiments of a fixed magnetic disk apparatus according to the present invention will be described while referring to the accompanying drawings. As shown in FIG. 1, which is a plan view of the essential features of a first embodiment, a magnetic disk apparatus according to the present invention has a magnetic disk 1 which is rotated in the direction of arrow A by an unillustrated rotating mechanism. The disk 1 has an annular data zone 1a and a landing zone 1b formed on its surface, the landing zone 1b being located along the inner periphery of the data zone 1a. Unlike a conventional disk, positional information is recorded on the disk 1 only within the data zone 1a, while the landing zone 1b contains no positional information. A conventional swinging arm actuator 2 is pivotably mounted on a shaft 5. A suspension 3 which supports a magnetic head 4 is mounted on the front end of the actuator 2. The degree of pivoting of the actuator 2 about the shaft 5 (and represented by the arrow C in FIG. 2) is limited by an inner stop 6a and an outer stop 6b. The actuator 2 is biased in the direction of arrow B by a coil spring 7 which is mounted on the shaft 5 and secured to the shaft 5 and the actuator 2. In accordance with the invention, vane means are secured to the actuator 2, herein shown as a plate 8, to produce a wind pressure torque for urging the actuator in a direction opposite the torque direction B of torque of the coil spring 7. The plate 8 is made of a light but rigid material and secured to the front end of the actuator 2 by suitable fasteners such as screws. The height of the plate 8 from the surface of the disk 1 and the angle of the plate 8 with respect to the actuator 2 and the direction of the wind as represented by the arrow D in FIG. 1 is such that the plate 8 will be subjected to wind pressure due to the rotation of the disk 1 and such that the wind pressure will exert a counterclockwise torque on the actuator 2 about the shaft 5 (in the direction opposing the torque exerted by the coil spring 7). Furthermore, in this embodiment, the position of the plate 8 on the actuator 2 is such that wind pressure will be exerted on the plate 8 when the magnetic head 4 is within the landing zone 1b but not after the magnetic head 4 has moved into the data zone 1a by a prescribed amount. The angle of the longitudinal axis of the plate 8 with respect to the longitudinal axis of the actuator 2 is such that when the plate 8 is located along the outer periphery of the disk 1 as shown by the dashed lines 2' in FIG. 1, the longitudinal axis of the plate 8 will be nearly tangential to the disk 1. This results in a sudden drop in the wind pressure acting on the plate 8 when it is moved to the outside of the disk 1. The plate 8 need not be mounted on the actuator 2 in exactly the manner shown in FIG. 1. Any position which results in the desired torque as described above is possible. For example, instead of being secured to the front end surface of the actuator 2, it could be secured to the surface of the actuator 2 which faces away from the center of the disk 1.

When the disk 1 is stationary, the actuator 2 is pressed against the inner stop 6a by the coil spring 7, and the magnetic head 4 sits on the surface of the landing zone 1b of the disk 1, as shown by the solid lines in FIG. 1. When the disk 1 begins to rotate in the direction of arrow A, the magnetic head 4 initially is in sliding contact with the surface of the landing zone 1b, but when the rotational speed reaches a certain level, the magnetic head 4 begins to float above the surface of the landing zone 1b. The rotation of the disk 1 produces a wind which exerts a wind pressure on the plate 8, the wind pressure producing a counterclockwise torque on the actuator 2 about the shaft 5. The wind pressure increases with the rotational speed of the disk 1, and when the rotational speed of the disk 1 exceeds a certain level, the counterclockwise torque due to the wind pressure on the plate 8 exceeds the clockwise torque exerted by the coil spring 7, and the actuator 2 is rotated counterclockwise about the shaft 5 until the torque acting on it due to the wind pressure balances the torque due to the coil spring 7. When the actuator 2 is in this new position shown by the dashed lines 2' in FIG. 1, the magnetic head 4 is situated just inside the radially inner periphery of the data zone 1a, in which positional information is recorded, while the plate 8 is positioned along the outer periphery of the disk 1. The strength of the coil spring 7 is selected such that the actuator 2 will not begin to rotate outwards until after the magnetic head 4 has begun to float above the surface of the landing zone 1a.

Upon entering the radially inner portion of the data zone 1a, the magnetic head 4 reads positional information recorded on the disk 1, and the position of the magnetic head 4 is controlled by servo control using an unillustrated voice coil motor in a conventional manner. When the magnetic head 4 is moved slightly farther into the data zone 1a by a prescribed amount by the voice coil motor, the plate 8 is moved far enough from the outer periphery of the disk 1 that the wind pressure acting on it falls to substantially zero and does not affect the movement of the actuator 2. Thus, when the magnetic head 4 is in the data zone 1a by the prescribed distance, the movement of the actuator 2 can be controlled in exactly the same manner as in a conventional disk apparatus.

Figure 2:
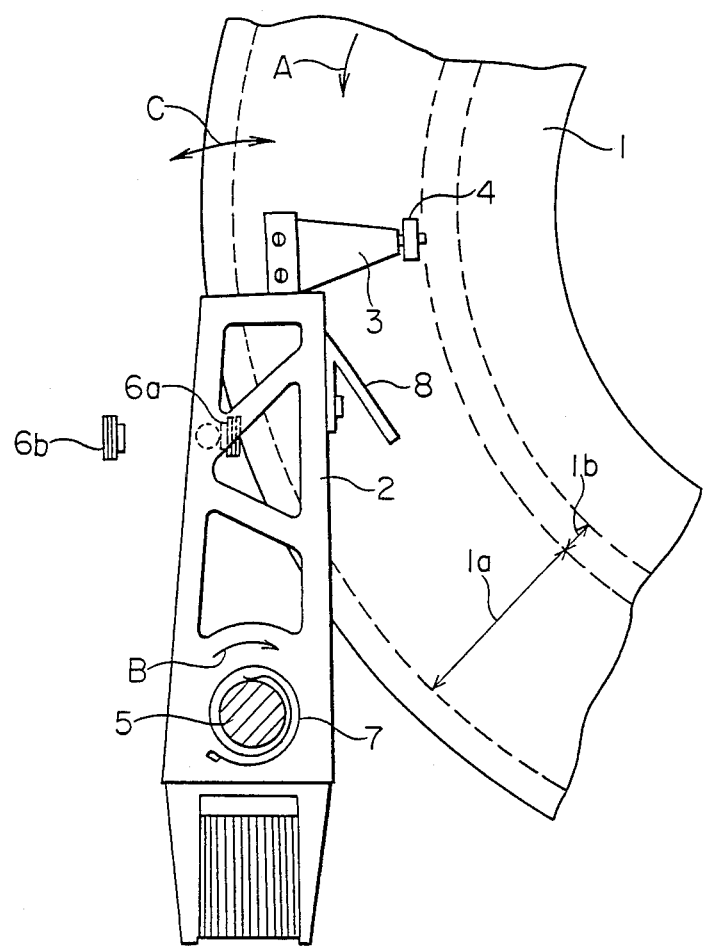
FIG. 2 is a plan view of the essential features of a second embodiment of the present invention.

In the above-described first embodiment, when the magnetic head 4 is in the data zone 1a, no wind pressure acts on the plate 8, and the unillustrated voice coil motor which controls the rotation of the actuator 2 must oppose the entire torque exerted on the actuator 2 by the coil spring 7. However, by suitably mounting the plate 8 on the actuator 2, the torque due to wind pressure can be made to largely balance the torque due to the coil spring 7, thereby reducing the force which must be exerted by the voice coil motor. FIG. 2 is a plan view of the essential features of a second embodiment of the present invention which has such a structure. This embodiment differs from the first only in the location of the plate 8, which is secured to the side of the actuator 2 by screws or other suitable fasteners in a position such that it will be subjected to wind pressure at all times when the magnetic head 4 is in the data zone 1a or the landing zone 1b. It is angled with respect to the actuator 2 so that the wind pressure acting thereon due to the rotation of the disk 1 will exert a torque in the direction opposite the torque exerted by the coil spring 7, i.e., in a direction tending to rotate the actuator 2 so as to move the magnetic head 4 from the landing zone 1b into the data zone 1a.

When the magnetic head 4 is located just inside the data zone 1a as shown in FIG. 2, the torque on the actuator 2 due to wind pressure just balances the torque due to the coil spring 7. The wind pressure acting on the plate 8, and thus the torque acting on the actuator 2 due to the wind pressure, increase as the plate 8 moves farther from the center of the disk 1 than the position shown in FIG. 2. On the other hand, the torque exerted by the coil spring 7 also increases as the actuator 2 rotates away from the center of the disk 1. Thus, when the actuator 2 is pivoted outwards from the equilibrium position shown in FIG. 2 by an unillustrated voice coil motor, even though the two opposing torques (the wind pressure torque and the coil spring torque) will no longer exactly cancel, they will largely balance one another, and the net torque which the voice coil motor must oppose in order to rotate the actuator 2 will be much smaller than in the first embodiment. In this embodiment as in the first embodiment, the position of the magnetic head 4 within the data zone 1a is controlled by servo control in a conventional manner.

In both of the above embodiments, as the landing zone of the magnetic disk has no positional information recorded thereon, there is no possibility of positional information deteriorating due to contact with the magnetic head during starting or stopping, and the lifespan of the disk can be enormously increased. Furthermore, as it is unnecessary to protect the landing zone by the provision of a protective film or the like, the manufacturing costs of the disk can be decreased.

What is claimed is:

1. A CSS-type fixed magnetic disk apparatus comprising:
   a rotatable fixed magnetic disk having a data zone and a landing zone formed on the surface thereof, said landing zone being located along the radially inner periphery of said data zone, said landing zone having no positional information recorded thereon, said magnetic disk producing wind adjacent the surface of the disk moving in the direction of rotation when the disk is rotating;

a pivotably-supported swinging arm actuator mounted to move in an arc above the surface of said disk across the zones;

a floating magnetic head which is supported by said actuator so as to pivot therewith and is in contact with the surface of said magnetic disk in the landing zone when the disk is stationary;

biasing means for exerting a biasing torque on said actuator so as to bias it in the direction tending to move said magnetic head inwardly relative to said disk toward said landing zone and for locating said magnetic head in said landing zone while said magnetic disk is stationary; and vane means secured to said actuator in a position above and adjacent the surface of the disk and at an angle to he direction of the wind for producing a wind pressure torque on said actuator in response to wind pressure exerted against said vane means by the wind when the rotation of said disk is started, the wind pressure torque being in the opposite direction to the biasing torque such that the magnitude of the torque exceeds that of the biasing torque when said magnetic head is positioned in said landing zone, and, when said disk reaches a certain rotational speed in excess of a speed at which said magnetic head begins to float, a wind pressure torque in response to wind pressure exerted against said vane exceeds the biasing torque and causes said actuator to pivot and thereby move said magnetic head from said landing zone into said data zone.

2. A magnetic disk apparatus as claimed in claim 1 wherein said vane means comprises a plate secured to said actuator at a position which is beyond an outer periphery of said disk and no longer subjected to wind pressure when said magnetic head has entered said data zone by a prescribed amount.

3. A magnetic disk apparatus as claimed in claim 2 wherein said plate extends nearly tangential to the outer periphery of said disk when said plate is adjacent and outside the outer periphery of said disk.

4. A magnetic disk apparatus as claimed in claim 3 wherein said actuator includes a front end, and said plate is secured to said front end.

5. A magnetic disk apparatus as claimed in claim 1 wherein said vane means comprises a plate secured to said actuator at a position which is over the surface of said disk and is subjected to wind pressure at all times when said magnetic head is located within said data zone.

6. A magnetic disk apparatus as claimed in claim 5 wherein said plate extends nearly tangential to the outer periphery of said disk when said plate is adjacent and outside the outer periphery of said disk.

7. A magnetic disk apparatus as claimed in claim 5 wherein said actuator includes a side edge ;ocated over the surface of said disk, and said plate is seucred to said side edge.

8. A magnetic disk apparatus as claimed in claim 1 wherein the wind pressure torque and the biasing torque are substantially equal and substantially balance each other as said magnetic head moves across the data zone.

9. A CSS-type fixed magnetic disk apparatus comprising:

a rotatable fixed magnetic disk having a data zone and a landing zone formed on the surface thereof, said landing zone being located along the radially inner periphery of said data zone, said landing zone having no positional information recorded thereon, said magnetic disk producing wind adjacent the surface of the disk moving in the direction of rotation when the disk is rotating;

a pivotably-supported swinging arm actuator mounted to move in an arc above the surface of said disk across the zones;

a floating magnetic head which is supported by said actuator so as to pivot therewith and is in contact with the surface of said magnetic disk in the landing zone when the disk is stationary;

biasing means for exerting a biasing torque on said actuator so as to bias it in the direction tending to move said magnetic head inwardly relative to said disk toward said landing zone, said biasing torque increasing in magnitude as the distance of said magnetic head from the center of said disk increases and for locating said magnetic head in said landing zone while said magnetic disk is stationary; and vane means secured to said actuator for producing a wind pressure torque on said actuator in response to wind pressure exerted against said vane means by the wind when the rotation of said disk is started, said wind pressure torque increasing in magnitude as the distance of said magnetic head from the center of said disk increases as said actuator pivots outwardly relative to said disk, the wind pressure torque being in the opposite direction to the biasing torque such that the magnitude of the torque exceeds that of the biasing torque when said magnetic head is positioned in said landing zone, and, when said disk reaches a certain rotational speed in excess of a speed at which said magnetic head begins to float, a wind pressure torque in response to wind pressure exerted against said vane exceeds the biasing torque and causes said actuator to pivot and thereby move said magnetic head from said landing zone into said data zone, the biasing torque and the wind pressure torque remaining substantially equal and substantially balancing each other as said magnetic head moves across the data zone.

10. A magnetic disk apparatus as claimed in claim 9 wherein said vane means comprises a plate secured to said actuator at a position which is beyond an outer periphery of said disk and no longer subjected to wind pressure when said magnetic head has entered said data zone by a prescribed amount.

11. A magnetic disk apparatus as claimed in claim 10 wherein said plate extends nearly tangential to the outer periphery of said disk when said plate is adjacent and outside the outer periphery of said disk.

12. A magnetic disk apparatus as claimed in claim 9 wherein said vane means comprises a plate secured to said actuator at a position which is over the surface of said disk and is subjected to wind pressure at all times when said magnetic head is located within said data zone.

13. A magnetic disk apparatus as claimed in claim 12 wherein said plate extends nearly tangential to the outer periphery of said disk when said plate is adjacent and outside the outer periphery of said disk.

* * * * *